US012639586B2

(12) United States Patent
Nath

(10) Patent No.: US 12,639,586 B2
(45) Date of Patent: May 26, 2026

(54) SCORING CORRELATED INDEPENDENT VARIABLES FOR ELIMINATION FROM A DATASET

(71) Applicant: Oracle Financial Services Software Limited, Goregaon (IN)

(72) Inventor: Mridul Kumar Nath, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 972 days.

(21) Appl. No.: 17/733,420

(22) Filed: Apr. 29, 2022

(65) Prior Publication Data

US 2023/0351211 A1 Nov. 2, 2023

(51) Int. Cl.
G06N 5/022 (2023.01)
G06N 5/04 (2023.01)

(52) U.S. Cl.
CPC .............. G06N 5/022 (2013.01); G06N 5/041 (2013.01)

(58) Field of Classification Search
CPC ............................... G06N 5/022; G06N 5/041
See application file for complete search history.

(56) References Cited

PUBLICATIONS

Vu, Dao Hoang, Kashem M. Muttaqi, and Ashish P. Agalgaonkar. "A variance inflation factor and backward elimination based robust regression model for forecasting monthly electricity demand using climatic variables." Applied Energy 140 (2015): 385-394. (Year: 2015) (Year: 2015).*
Ballabio, Davide, et al. "A novel variable reduction method adapted from space-filling designs." Chemometrics and Intelligent Laboratory Systems 136 (2014): 147-154. (Year: 2014) (Year: 2014).*
Tanioka, Kensuke, Yuki Furotani, and Satoru Hiwa. "Thresholding approach for low-rank correlation matrix based on mm algorithm." Entropy 24.5 (2022): 579. (Year: 2022) (Year: 2022).*
Oh, Taeseob, et al. "Machine learning-based diagnosis and risk factor analysis of cardiocerebrovascular disease based on KNHANES." Scientific reports 12.1 (2022): 2250. (Year: 2022) (Year: 2022).*
Chan, Jireh Yi-Le, et al. "Mitigating the multicollinearity problem and its machine learning approach: a review." Mathematics 10.8 ( 2022): 1283. (Year: 2022).*

(Continued)

*Primary Examiner* — Miranda M Huang
(74) *Attorney, Agent, or Firm* — Kilpatrick Townsend & Stockton LLP

(57) ABSTRACT

Techniques are disclosed as an optimization data system for eliminating correlated independent variables programmatically from data with ranked exclusion scores. The system can obtain an initial dataset comprising variables, determine a set of correlation values by analyzing linear correlation between the variables, generate a correlation matrix using at least in part the set of correlation values and corresponding variables from the initial data, calculate exclusion scores for the variables in the correlation matrix that exhibit multicollinearity, and update the initial dataset by removing at least one variable with the highest exclusion score from the variables to generate an updated dataset comprising optimized variables. The steps for correlation and elimination of variables are iterated until an updated dataset without any correlation is obtained and then a machine learning model may be trained using the updated dataset.

17 Claims, 9 Drawing Sheets

(56) References Cited

PUBLICATIONS

Nie, Guangli, et al. "Credit card churn forecasting by logistic regression and decision tree." Expert Systems with Applications 38. 12 (2011): 15273-15285. (Year: 2011) (Year: 2011).*

Peng, Hanchuan, Fuhui Long, and Chris Ding. "Feature selection based on mutual information criteria of max-dependency, max-relevance, and min-redundancy." IEEE Transactions on pattern analysis and machine intelligence 27.8 (2005): 1226-1238. (Year: 2005) (Year: 2005).*

James, Gareth, et al. An introduction to statistical learning. vol. 112. New York: springer, 2013. (Year: 2013) (Year: 2013).*

Adnan et al., A Comparative Study on Some Methods for Handling Multicollinearity Problems, Matematka, vol. 22, No. 2, Jan. 2006, pp. 109-119.

Garg et al., Comparison of Regression Analysis, Artificial Neural Network and Genetic Programming in Handling the Multicollinearity Problem, Proceedings of International Conference on Modelling, Identification and Control, Available Online at: https://ieeexplore. ieee.org/document/6260224, Jun. 24-26, 2012, pp. 353-358.

Paul, Multicollinearity: Causes, Effects and Remedies, Mathematics, Available Online at: https://www.semanticscholar.org/paper/MULTICOLLINEARITY%3ACAUSES%2CEF-FECTSANDREMEDIESPaul/300f806f39ea84cfbe999cb52903726a2e8f0458, 2008, 14 pages.

* cited by examiner

| # | Column 1 | Column 2 | Correlation |
|---|----------|----------|-------------|
| 1 | AGE | YRS_RESIDENCE | 0.69039 |
| 2 | AGE | HOME_THEATER_PACKAGE | 0.79107 |
| 3 | AGE | Y_BOX_GAMES | -0.72355 |
| 4 | YRS_RESIDENCE | HOME_THEATER_PACKAGE | 0.64896 |
| 5 | YRS_RESIDENCE | Y_BOX_GAMES | -0.60796 |
| 6 | BULK_PACK_DISKETTES | FLAT_PANEL_MONITOR | 0.8879 |
| 7 | HOME_THEATER_PACKAGE | Y_BOX_GAMES | -0.75985 |

SCORING CORRELATED INDEPENDENT VARIABLES FOR ELIMINATION FROM A DATASET

FIELD

The present disclosure relates generally to a data optimization system, and more particularly, to techniques for programmatically eliminating correlated independent variables from data with ranked exclusion scores.

BACKGROUND

Various algorithms are used by machine learning systems to examine data, learn from the data, and make decisions based on what the systems learn from the data. Supervised algorithms include classification and regression algorithms, while un-supervised algorithms include clustering and association algorithms. Supervised algorithms provide a way of predicting future happenings between a dependent (target) and one or more independent variables (also known as a predictor). In other words, supervised algorithms provide a way of mathematically sorting out which of those variables does indeed have an impact. The independent variables are utilized by the model to explain or predict changes in the dependent variable. The dependent variable is what the model is attempting to explain or predict. Regression and classification have a wide range of real-life applications and are important for any machine learning problem that involves continuous numbers or decisions. This includes financial forecasting and sales forecasting, which would use regression algorithms, while weather analysis and sports predictions would use classification algorithms. Supervised algorithms can estimate the strength of impact that multiple independent variables can have on a dependent variable. If the value of one independent variable is changed, models built on supervised algorithms can identify what effect that will have on the dependent variable.

Nonetheless, regression algorithms, and to some extent other algorithms such as the classification algorithms, suffer from various interpretability problems including multicollinearity. Multicollinearity is a condition where there is a significant dependency or association between the independent variables or the predictor variables. The multicollinearity affects interpretation because the objective in the analysis is to find out how each predictor is impacting the target variable individually. However, if the predictors are affecting one another and the independency assumption is invalid, then it is difficult to solve the objective and find parameter or coefficient estimates of the model. Multicollinearity can exist in a dataset for several reasons including problems in the dataset at the time of creation, problems that arise during the creation of new variables which are dependent on other variables, when there are identical variables in the dataset, from the creation of dummy variables to encode various features, or in some instance where there is insufficient data. Nonetheless, for the model to have high accuracy, the inaccuracies of parameter or coefficient estimates caused by multicollinearity needs to be detected and corrected.

SUMMARY

Techniques are provided for eliminating correlated independent variables from data with ranked exclusion scores. Various embodiments are described herein, including methods, systems, non-transitory computer-readable storage media storing programs, code, or instructions executable by one or more processors, and the like.

In various embodiments, a method is provided comprising obtaining an initial dataset, wherein the initial dataset comprises a plurality of variables; determining a plurality of correlation values by analyzing linear correlation between at least two variables in the plurality of variables in the initial dataset; generating a correlation matrix using at least in part the plurality of correlation values and corresponding variables in the plurality of variables in the initial dataset; calculating exclusion scores for variables in the correlation matrix that exhibit multicollinearity; updating the initial dataset by removing at least one variable with the highest exclusion score from the plurality of variables to generate an updated dataset comprising an optimized plurality of variables, where the plurality of correlation values are determined, the correlation matrix is generated, and the initial dataset is updated iteratively until multicollinearity is no longer exhibited between the variables; training a machine learning model using the updated dataset, where the machine learning model comprises one or more algorithms to make an inference based on relationships between the optimized plurality of variables; and providing the trained machine learning model.

In some embodiments, the initial dataset comprises historical transaction data, loan records, credit records, a customer's profile, or any combination thereof.

In some embodiments, generating the correlation matrix using at least in part the plurality of correlation values and corresponding variables in the plurality of variables in the initial dataset, includes a process to: generate a threshold value used to compare with each correlation value in the plurality of correlation values; and incorporate the correlation values that are greater than the threshold value with corresponding variables into the correlation matrix.

In some embodiments, calculating the exclusion scores for the variables in the correlation matrix comprises: calculating redundancy value for the variables in the correlation matrix; and calculating prediction strength for the variables in the correlation matrix.

In some embodiments, a pre-set criteria is used to determine whether a significant linear correlation exists between at least two variables in the plurality of variables via a threshold value, and wherein the variables determined to exhibit the significant linear correlation are identified as the variables in the correlation matrix that exhibit multicollinearity.

In some embodiments, the training comprises adapting the machine learning model to minimize a difference between a final value for a dependent variable and ground truth information, updating model parameters, and obtaining the trained machine learning model with updated model parameters.

In some embodiments, the providing comprises deploying the trained machine learning model with the updated model parameters in a real-world environment.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 5 depicts an example of a correlation matrix in accordance with various embodiments.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Figure 1:
FIG. 1 depicts a typical sample dataset in accordance with various embodiments.
Figure 1:
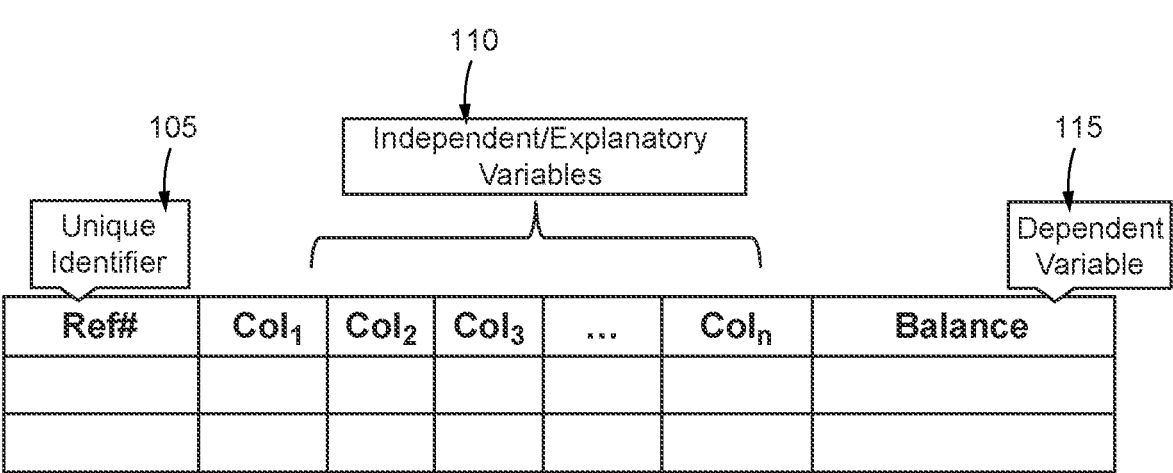

As shown in FIG. 1, a typical sample dataset 100 used in machine learning has three distinguishable parts:

Unique Identifier 105 for each row of data
Independent or explanatory variables 110
Dependent variable 115

A machine learning model is built using various combinations of the independent variables to predict the dependent variable. As described herein, multicollinearity is the presence of a correlation between pairs of independent variables in a given sample dataset. A presence of multicollinearity makes it difficult to distinguish between the individual effects of the independent variables on the dependent variable, which leads to unstable parameter or coefficient estimates in the model. Nonetheless, in order for the model to have high accuracy, the inaccuracies of parameter or coefficient estimates caused by multicollinearity needs to be detected and corrected.

One of the methods to detect the existence of multicollinearity is by creating a correlation matrix at a particular threshold correlation value. The output of correlation matrix, where any pair of independent variables, having a correlation value >0.5 (default) and less than 1.0 are represented as below in Table 1. Needless to mention, the correlation matrix is a function of the selected correlation value threshold, and its findings only show the bivariate relationship between the independent variables.

TABLE 1

| # | Column 1 | Column 2 | Correlation |
|---|----------|----------|-------------|
| | Correlation Matrix for Threshold 0.5 | | |
| 1 | AGE | YRS_RESIDENCE | 0.69039 |
| 2 | AGE | HOME_THEATRE_PACKAGE | 0.79107 |
| 3 | AGE | Y_BOX_GAMES | −0.72355 |
| 4 | YRS_RESIDENCE | HOME_THEATRE_PACKAGE | 0.64896 |
| 5 | YRS_RESIDENCE | Y_BOX_GAMES | −0.60796 |
| 6 | BULK_PACK_DISKETTES | FLAT_PANEL_MONITOR | 0.8879 |
| 7 | HOME _THEATRE_PACKAGE | Y_BOX_GAMES | −0.75985 |

Eliminating multicollinearity from the sample dataset is a required data evaluation step in building a model such as a regression or a classification model. This is achieved by breaking the correlated pairs of independent variables by removing either one of the variables from the identified pair, during the model building process. One of the traditional approaches has been to calculate the correlation matrix and then use human intuition, tempered with business knowledge to identify, and eliminate one of the distinct independent variables within a correlated pair. The adopted strategy attempts to keep the overall list of eliminated variables as short as possible so that information loss is kept to a minimum. For example, in the correlation matrix shown in Table 1, human intuition would suggest the potential list of candidates for elimination as:

| 1) | Elimination of AGE results in the top three pairs (1, 2 & 3) to be broken |
|----|---|
| 2) | YRS_RESIDENCE, if eliminated, removes 4 & 5 |
| 3) | Removal of either one BULK_PACK_DISKETTES or FLAT_PANEL_MONITOR breaks 6 |
| 4) | HOME_THEATER_PACKAGE, if eliminated, breaks 7 |

This human intuition centric approach considers variable redundancy across multiple pairs through visual confirmation, but it fails to recognize the inherent prediction strength of the variable being eliminated.

To overcome these challenges and others, the techniques described herein are directed to eliminating correlated independent variables from data with ranked exclusion scores. These techniques allow for a suitable score, called the exclusion score, to be calculated and assigned to each one of the identified distinct independent variables, considering both the variable redundancy as well as the inherent prediction strength of the variable. Independent variables with higher exclusion score are candidates for early elimination from the sample dataset to be used to build the model. In one embodiment, a method to train a machine learning model includes obtaining an initial dataset comprising a plurality of variables, determining a plurality of correlation values by analyzing linear correlation between at least two variables in the plurality of variables in the initial dataset, generating a correlation matrix using at least in part the plurality of correlation values and corresponding variables in the plurality of variables in the initial dataset, calculating exclusion scores for variables in the correlation matrix that exhibit multicollinearity, and updating the initial dataset by removing at least one variable with the highest exclusion score from the plurality of variables to generate an updated dataset comprising an optimized plurality of variables. The plurality of correlation values are determined, the correlation matrix is generated, and the initial dataset is updated iteratively until multicollinearity is no longer exhibited between the variables. Once multicollinearity is no longer exhibited between the variables, a machine learning model may be trained using the updated dataset and provided for an inference phase. The machine learning model comprises one or more algorithms to make an inference based on relationships between the optimized plurality of variables.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework where one can ascertain how a change in the value of each independent variable affects the value of the dependent variable(s).

Model Building Pipeline

Figure 2:
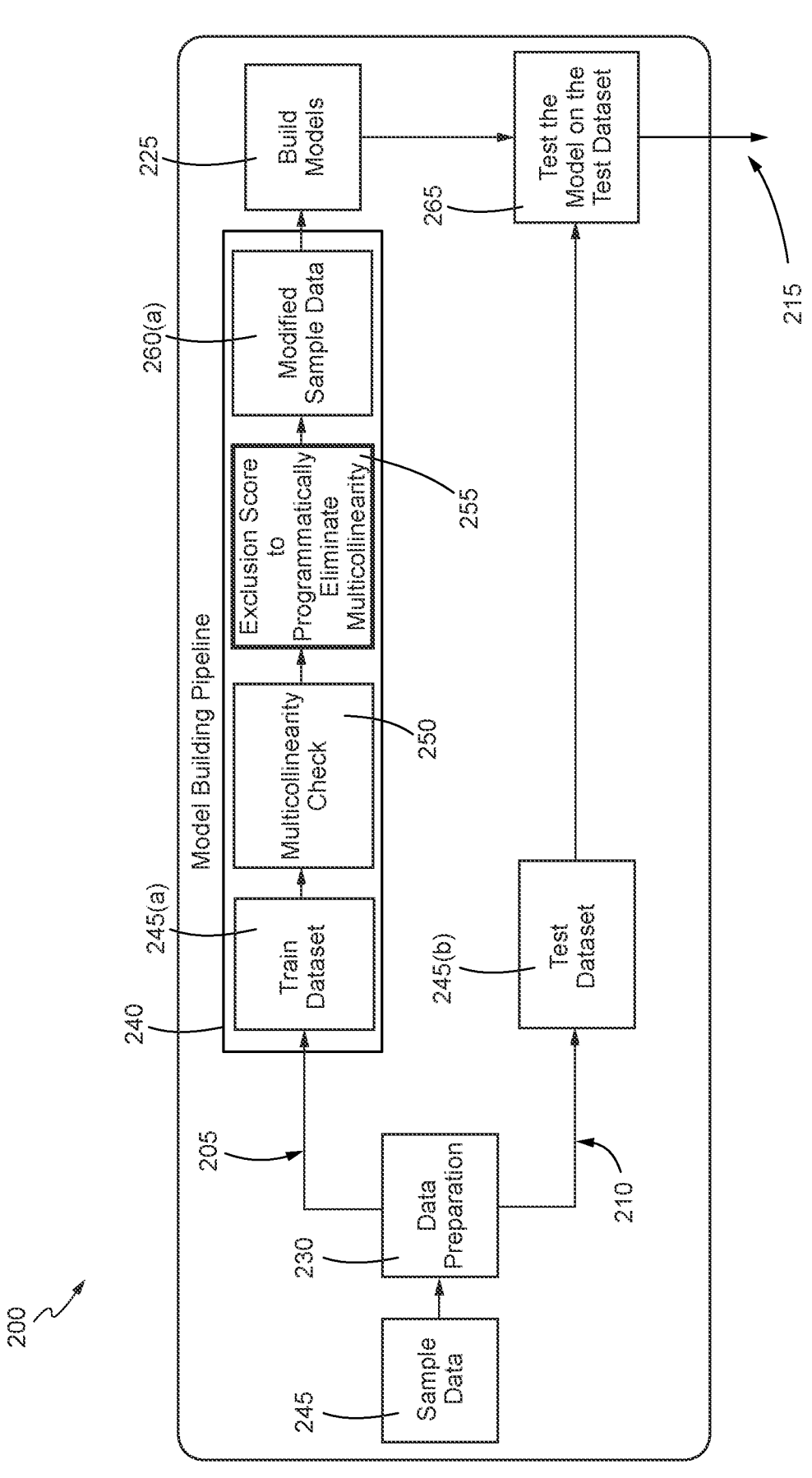
FIG. 2 depicts a block diagram illustrating a machine learning pipeline in accordance with various embodiments.

FIG. 2 is a block diagram illustrating a machine learning pipeline 200 in accordance with various embodiments. As shown in FIG. 2, the machine learning pipeline 200 includes various stages: a prediction model training stage 205 to build and train models, an evaluation stage 210 to test and evaluate performance of trained models, and an implementation stage 215 for implementing one or more models. The prediction model training stage 205 builds and trains one or more prediction models 225a-225n ('n' represents any natural number) to be used by the other stages (which may be referred to herein individually as a prediction model 225 or collectively as the prediction models 225a-225n). For example, the prediction models 225 can include a model for performing financial forecasting, a model for performing sales forecasting, and a model for predicting a dependent variable from independent variables. Still other types of prediction models may be implemented in other examples according to this disclosure.

A prediction model 225 can be a machine learning ("ML") model, such as a convolutional neural network ("CNN"), e.g., an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier). A prediction model 225 can also be any other suitable ML model trained for providing a recommendation, such as a Generative adversarial network (GAN), Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The implementation stage 215 may employ the same type of prediction model or different types of prediction models for providing predictions to users. Still other types of prediction models may be implemented in other examples according to this disclosure.

To train the various prediction models 225, the training stage 205 is comprised of two main components: dataset preparation module 230 and model training framework 240. The dataset preparation module 230 performs the processes of loading data assets 245, splitting the data assets 245 into training and validation sets 245 a-n so that the system can train and test the prediction models 225, and pre-processing of data assets 245. The splitting the data assets 245 into training and validation sets 245 a-n may be performed randomly for regression or stratified splitting in case of classification on a predefined split such as a 60/40% or 70/30% split.

The training data 245a may include at least a subset of sample data from the business data received from one or more entities. For instance, the sample data can be received from banks, merchants, or customers. The sample data may comprise historical transaction data, loan records, credit records, customers profile, and the like. In some examples, the sample data can be extracted from population data using random sampling or stratified sampling. The sample data can be obtained in various ways including image or text. For example, if the sample data is provided as images of transactions, the data preparation 230 may convert the images to text using an image-to-text converter (not shown) that performs text recognition (e.g., optical character recognition) to determine the text within the image. Additionally or alternatively, the data preparation module 230 may standardize the format of the sample data. In some instances, the sample data is provided by a second party or a third party different from a first party training the prediction model 225. The training data 245a for a prediction model 225 may include the sample data and labels corresponding to the sample data as a matrix or table of values. For example, ground truth information for labels may be provided for each independent variable and a dependent variable to be inferred by the prediction model 225. The behavior of the prediction model 225 can then be adapted (e.g., through MinMax or ALS optimization or Gradient Descent) to minimize the difference between the generated inferences and the ground truth information.

The model training framework 240 includes a multicollinearity check module 250 that generates exclusions scores 255 to programmatically eliminate independent variables within the training data 245a and to generate modified training data 260a (also described herein as optimized or final training data). The check for multicollinearity is performed by the multicollinearity check module 250, and if multicollinearity is detected, it is eliminated programmatically using the proposed exclusion score(s) 255. The multicollinearity check module 250 derives the exclusion scores 255 utilizing variable redundancy as well as inherent prediction strength of the variable, as described in detail with respect to FIG. 3. The exclusion score(s) 255 allow the pipeline 200 to rank and iteratively eliminate the high ranked variables to get the modified training data 260*a* having no multicollinearity, on which the prediction model 225 can be trained and built.

The model training framework 240 performs the processes of determining hyperparameters for the model 225 and performing iterative operations of inputting examples from the modified training data 260*a* into the model 225 to find a set of model parameters (e.g., weights and/or biases) that minimizes a cost function(s) such as loss or error function for the model 225. The hyperparameters are settings that can be tuned or optimized to control the behavior of the model 225. Most models explicitly define hyperparameters that control different features of the models such as memory or cost of execution. However, additional hyperparameters may be defined to adapt the model 225 to a specific scenario. For example, regularization weight, strength of weights or biases, the number of hidden units of a model, the learning rate of a model, the convolution kernel width, or the number of kernels, and the like. The cost function can be constructed to measure the difference between the outputs inferred using the models 225 and the ground truth annotated to the samples using the labels. For example, for a supervised learning-based model, the goal of the training is to learn a function "h( )" (also sometimes referred to as the hypothesis function) that maps the training input space X to the target value space Y, h:X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters are identified, the model 225 has been trained and the pipeline 200 performs the additional processes of testing or validation 265 using the subset of testing data 245*b* (testing or validation dataset). The testing or validation processes includes iterative operations of inputting examples from the subset of testing data 245*b* into the model 225 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 245*b* may be input into the model 225 to obtain output (in this example, one or more predictions for a dependent variable), and the output is evaluated versus ground truth entities using correlation techniques such as Bland-Altman method and the Spearman's rank correlation coefficients. Further, performance metrics may be calculated in evaluation stage 210 such as the error, accuracy, precision, recall, receiver operating characteristic curve (ROC), etc. The metrics may be used in the evaluation stage 210 to analyze performance of the model 225 for providing predictions. Advantageously, due to multicollinearity between independent variables having been eliminated from the data (i.e., modified training data 260*a*) used to train the prediction model 225, the testing result may be more accurate and efficient to predict the dependent variables from the independent variables.

The model training stage 205 and the evaluation stage 210 output trained models including one or more trained prediction models. The one or more trained prediction models may be deployed and used in the implementation stage 215 for providing predictions to users. For example, trained prediction models may receive input data including a customer profile, a list of products, and product characteristics from a second party for a first party and provide predictions on dependent variables to a user.

Techniques for Eliminating Multicollinearity

Figure 3:
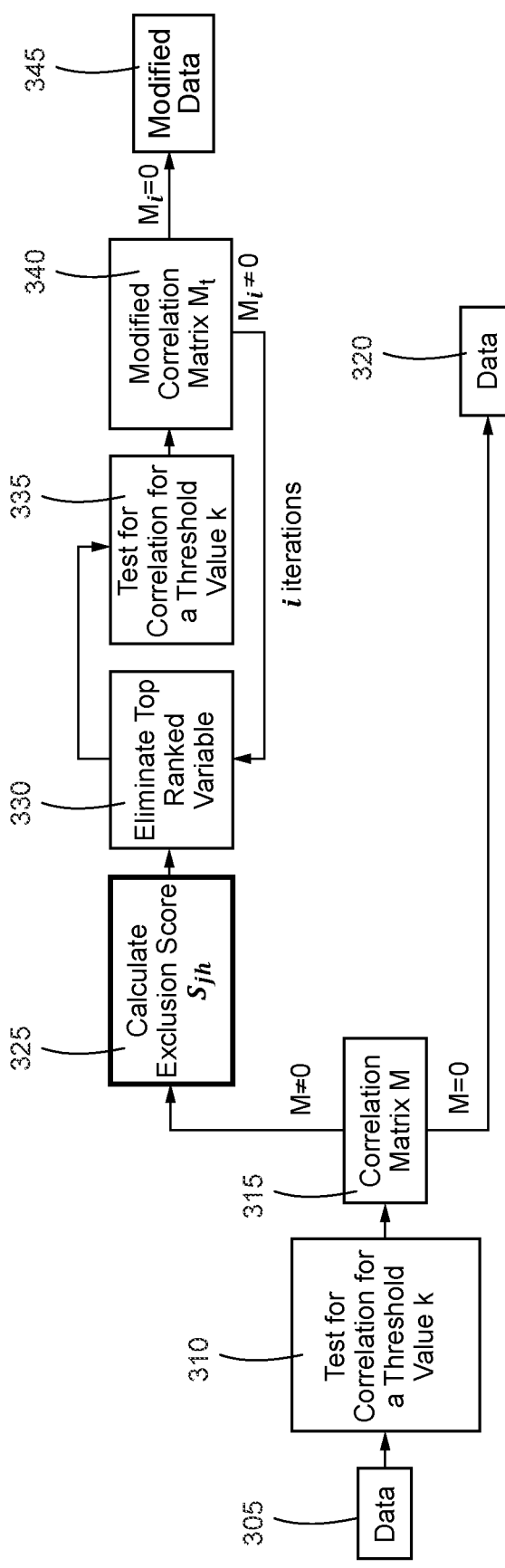
FIG. 3 depicts a flowchart illustrating a process for eliminating multicollinearity in sample data in accordance with various embodiments.

FIG. 3 is a flowchart illustrating a process 300 for eliminating multicollinearity in sample data in accordance with various embodiments. The process 300 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order, or some steps may also be performed in parallel. In certain embodiments, such as in the embodiments depicted in FIG. 2, the processing depicted in FIG. 3 may be performed by a computing environment (e.g., pipeline 200) using a model training framework (e.g., model training framework 240) to eliminate multicollinearity in sample data to be used for training a prediction model (e.g., prediction model 225).

The process 300 commences in step 305, the process 300 can be implemented in software executed by processors of system or hardware to input data including a set of variables (e.g., independent and dependent variables). In some examples, the data can be business data received from various entities. For instance, the data can be received from banks, merchants, or customers. The data may comprise historical transaction data, loan records, credit records, customer profiles, etc. In some examples, historical transaction data can be information gathered from transactions taking place between customers and banks or merchants. Specifically, the transactional data record information can include the time and location of the transaction, the quantity and quality of the products purchased, the prices of the products purchased, indication of whether any discounts were given, and the method used to pay for the purchases. In some examples, the customers profile may include detailed descriptions of current and past customers. The customers profile can also be used to identify customers' purchasing behaviors, pain points, psychographics, and demographics for marketing to similar customers in the future. The loan records can include a payment history with lenders. The payment history can show the amount of money paid for bills on time. Based on the history records, the credit score can be calculated. The credit records may include credit history. The credit history includes the total debt loan, the number of credit lines, and the timeliness of payments. The credit history may be used for prospective banks or merchants to determine whether a new line of credit will be offered to a customer and determine loan terms. From the dataset point of view to the data, a dataset may include different variables. For example, two kinds of variables commonly used in dataset include independent variables, which are usually used as explanatory variables, and dependent variables. The dependent variables can be predicted or generated from the derivation of the independent variables. Also, the unique identifier can be included in the dataset and act as a primary key to identify a specific record and variables associated with it.

Figure 4:
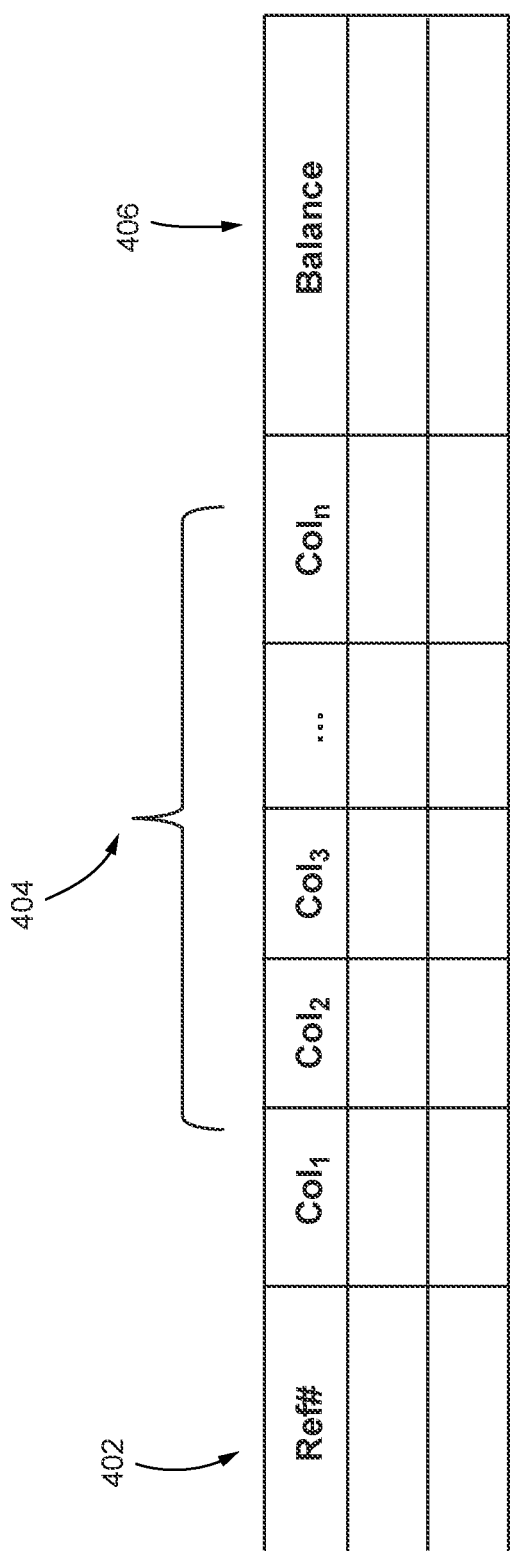
FIG. 4 depicts an example of a sample dataset in accordance with various embodiments.

By referring to FIG. 4, FIG. 4 depicts an example of a dataset 400 in accordance with various embodiments. In some examples of this dataset 400, the unique identifier 402 (i.e., Ref #) can be used as the primary key in the dataset 400 to identify each record in the different rows. The variables included in the dataset 400 can be classified as independent variables 404 and dependent variables 406. Typically, the independent variables 404 are used to determine the dependent variable 406. In this example of dataset 400, the columns 1 to n (i.e., $Col_1$ to $Col_n$) can be independent variables 404. The independent variable 404 will be used to determine or predict the dependent variable 406, which is referred to as "Balance" in the last column. As one example of using the dataset 400 in the context of business, historical transactional data, loan records, credit records, and the like, the independent variables 404 can be used to determine the amount of loan provided to customers and loan terms in dependent variables 406. In another example of using the dataset 400 in the context of business, a machine learning model can use data recorded in the independent variables 404 as a training dataset to determine the amount of loan provided to customer and loan terms in dependent variables 406. As such, the independent variables can also be called explanatory variables to the dependent variables 406.

Moreover, in the independent variables 404, there may be existing correlations among the independent variables 404 (i.e., $Col_1$ to $Col_n$) themselves. When correlation exists between different pairs of independent variables 404, the machine learning model may be impacted and unable to provide an accurate and efficient prediction result of the dependent variables 406 since the independent variables 404 may have influenced the robustness of the machine learning model. In certain examples, a correlation between different pairs of independent variables 404 may be called multicollinearity. Thus, eliminating the correlation between the independent variables 404 and the multicollinearity among the independent variables 404 may become required in building a machine learning model, such as a regression or classification model.

In step 310, a correlation value can be determined between at least two variables in the data. In one example, a linear correlation can be analyzed by linear correlation coefficients. By referring to FIG. 4 with another example, the linear correlation coefficient can be a number calculated from the dataset 400 that measures the strength of the linear relationship between at least two independent variables 404. And the sign of the linear correlation coefficient can indicate the direction of the linear relationship between the two independent variables 404. One way of identifying a linear correlation relationship between independent variables 404 is to determine whether two independent variables 404 as a pair are increasing or decreasing simultaneously. In other words, when one independent variable 404 is getting larger as another independent variable 404 gets larger in a pair of independent variables 404, a positive linear relationship exists between the two independent variables 404. Similarly, when one independent variable 404 is getting smaller as another independent variable 404 gets smaller in a pair of independent variables 404, a positive linear relationship exists between the two independent variables 404. Vice versa, when one independent variable 404 is getting larger as another independent variable 404 gets smaller in a pair of independent variables 404, a negative linear relationship exists between the two independent variables 404. Similarly, when one independent variable 404 is getting smaller as another independent variable 404 gets larger in a pair of independent variables 404, a negative linear relationship exists between the two independent variables 404.

In step 315, a correlation matrix can be generated using the correlation values described in step 310 and the corresponding variables in the data. In some examples referring to FIG. 4, the correlation matrix can be used to include independent variables 404 described in FIG. 4 and step 305, correlation value calculated by the way described in step 310, and the unique identifier 402 described in FIG. 4 and step 305. In a certain implementation, the correlation matrix can be used for checking the existence of multicollinearity between variables with corresponding correlation values. In another implementation, the correlation matrix can be used for checking the existence of multicollinearity between variables with corresponding correlation values that meet pre-set criteria. Such a correlation relationship between variables with correlation values that meet pre-set criteria would be considered significant existence of multicollinearity. In other implementations, by incorporating every variable pair with a correlation value meets pre-set criteria value into the correlation matrix, the variable with the most multicollinearity can be removed from the data by referring to the correlation matrix. When a machine learning model takes the data as training data to train the model, the impact on accuracy and efficiency can be reduced by removing the variables having the most multicollinearity.

FIG. 5 depicts an illustrating an example of correlation matrix 500 in accordance with various embodiments. In some examples, the correlation matrix 500 may include a simple serial number for rows in the resultant correlation matrix output. For example, the first serial number #1 may refer to the first record 502, including two independent variables (i.e., AGE and YRS_RESIDENCE) in Column 1 and Column 2, and the corresponding correlation value calculated between the two independent variables, AGE and YRS_RESIDENCE. In another example, the fourth serial number #4 may refer to the fourth record 504, including two independent variables (i.e., YRS_RESIDENCE and HOME_THEATER_PACKAGE) in Column 1 and Column 2 and the corresponding correlation value calculated between the two independent variables, YRS_RESIDENCE and HOME_THEATER_PACKAGE. In the last example, the fifth serial number #5 refers to the fifth record 506 including two independent variables (i.e., YRS_RESIDENCE and Y_BOX_GAMES) in Column 1 and Column 2 and the corresponding correlation value calculated between the two independent variables, YRS_RESIDENCE and Y_BOX_GAMES. In a certain implementation, the correlation matrix 500 may be generated using the correlation values described above via pre-set criteria. As shown in FIG. 5, the correlation matrix is generated via the pre-set criteria. Thus, each record in the correlation matrix has met the pre-set criteria for use in further steps. In some examples, the pre-set criteria can be a predetermined threshold value or dynamically generated threshold value based on the business scenarios at hand. In a certain implementation, the threshold value is used as pre-set criteria for use in generating correlation matrix 500 in FIG. 5.

The correlation matrix may demonstrate a specific example of being generated by incorporating the independent variables pairs with a correlation value exceeding a threshold value, which is pre-set criteria. In this example, the threshold value is pre-set to 0.5. In another implementation, the threshold value can be used to indicate whether the independent variables should be included in the correlation matrix, which means the independent variables have a significant linear correlation with other independent variables. As such, the threshold is being used to compare with each correlation value that corresponds to an independent variable pair. Suppose the correlation values after performing the mathematical absolute value function are greater than the threshold value of 0.5. In that case, the corresponding independent variable pairs should be included in the correlation matrix 500. The reason for performing mathematical absolute value function to correlation values for comparing with threshold is that both signs (i.e., positive and negative) are capable of indicating the existence of a significant linear correlation between the two independent variables in a pair. As seen in FIG. 5, each correlation value is greater than the threshold value (i.e., pre-set criteria) in the correlation matrix 500 regardless of their signs. For example, in the fifth record 506, the correlation value shows −0.60796. After performing the mathematical absolute value function to −0.60796, the correlation value became 0.60796, greater than the threshold value of 0.5.

Each independent variable in the set of variables is compared with the threshold value for use in determining whether the corresponding independent variables in a pair need to be included in the correlation matrix. In some examples of the threshold value at 0.5, referring to FIG. 5, if the correlation values after performing the mathematical absolute value function are greater than the threshold value 0.5, then the corresponding independent variable pairs should be included in the correlation matrix 500. Once each correlation value has been checked with the threshold value of 0.5, the correlation matrix 500 can be generated by incorporating independent variables in pairs that correspond to correlation values greater than the threshold value of 0.5 after the mathematical absolute value function. If none of the correlation values is greater than the threshold value, then at step 320 the data may be considered optimized data. That means no independent variables that have significant correlation existing in the data. However, if at least one of the correlation values is greater than the threshold value, then at step 325 the data is determined to have multicollinearity and forwarded for processing to eliminate the multicollinearity. That means independent variables have significant correlation existing in the data.

In step 325, the exclusion scores can be calculated for each independent variable in the correlation matrix 500. In some examples, the exclusion scores can be used to identify which independent variable needs to be eliminated first from the data. Hence, the adverse impact from the multicollinearity and significant linear correlation that exist between the independent variables in a pair can be reduced or minimized when training a machine learning data with the data. Further, the highest ranked independent variable can be identified and excluded from the data by ranking exclusion scores. In some examples, the data that excludes the independent variables that cause adverse impact (e.g., resulting in an inaccurate and inefficient prediction of dependent variables) to a training process in building a pipeline for regression or classification models. Then, the improvement in accuracy and efficiency can be achieved in the training process with the above data for optimizing the result of predicting the dependent variables from the independent variables. In a certain implementation, a designed formula can be used to calculate the exclusion scores for each independent variable in the correlation matrix, as shown in equation (1).

$$S_{j_h} = \frac{1}{(r_j e^{v_j})} \tag{1}$$

wherein $S_{j_h}$ can be an exclusion score of an independent variable j present in the correlation matrix via a threshold value h, the $r_j$ can be redundancy for the independent variable j present in the correlation matrix, and $v_j$ can be the prediction strength of the independent variable j present in the correlation matrix.

As described above, the correlation matrix can be generated via the pre-set criteria. And in some examples, the pre-set criteria can include the threshold value h to identify whether a significant linear correlation exists between the independent variables in the data. The variable that has a significant correlation to other independent variables may be included in the correlation matrix. Then each variable present in the correlation matrix can be further used to calculate the corresponding exclusion score with redundancy and prediction strength. In other examples, the redundancy $r_j$ can be calculated by the following equation (2).

$$r_j = \sum_{i=0}^{n} p_1(j)_i + p_2(j)_i \tag{2}$$

wherein the $r_j$ can be redundancy for the independent variable j present in the correlation matrix, $P_1(j)_i$ can be the count of an independent variable j present in the correlation matrix in the first column, $P_2(j)_i$ can be the count of an independent variable j present in the correlation matrix in the second column, and i can be the iteration count to refer to record that has corresponding independent variable j included.

In a specific example, by referring to FIG. 5, $P_1(j)_i$ can be the count of an independent variable j present in the correlation matrix 500 in Column 1, and $P_2(j)_i$ can be the count of an independent variable j present in the correlation matrix 500 in Column 2. In another specific example referring to FIG. 5, the redundancy of the independent variable YRS_RESIDENCE can be calculated by adding the count of YRS_RESIDENCE present in Column 1 and the count of YRS_RESIDENCE present in Column 2 for calculating the exclusion score. In this way, the redundancy of YRS_RESIDENCE may be calculated by the following equation (3).

$$r_j = 2 + 1 = 3 \tag{3}$$

Wherein the $r_j$ may the redundancy of independent variable YRS_RESIDENCE as example described above. Therefore, $r_j$ may be calculated to 3 from two times present in Column 1 and one time present in Column 2.

In one example of calculating prediction strength for independent variable j, the explanatory power functions in existing statistical software, such as R statistics or the like, can be employed for used to calculate prediction strength for independent variable j. The explanatory power can be defined as the ability of a hypothesis or theory to explain the subject matter effectively to which it pertains. In an aspect of machine learning model building in regression with the data, the explanatory power can be defined as the percentage of variation in the dependent variables that is explained by variation in the independent variables.

In one example of calculating the exclusion scores by referring to the correlation matrix 500 in FIG. 5, the exclusion score of the independent variable YRS_RESIDENCE can be calculated by the following equation (4).

$$S_{YRS\_RESIDENCE_{0.5}} = \frac{1}{\left(3 * e^{0.115562129074447}\right)} = 0.309855 \tag{4}$$

wherein the $S_{YRS\_RESIDENCE\ 0.5}$ can be the exclusion score of YRS_RESIDENCE at the threshold value 0.5, the redundancy $r_j$ of YRS_RESIDENCE has been calculated to 3 with equations (2) and (3), and the prediction strength $v_j$ of YRS_RESIDENCE can be calculated by existing statistical functions or software, such as R statistics or the like. In the specific example of the correlation matrix 500 in FIG. 5, the prediction strength $v_j$ of independent variable YRS_RESIDENCE is being calculated to 0.115562129074447. Next, the prediction strength $v_j$ can be inserted into equation (1) as shown in equation (4). Then, the exclusion score of YRS_RESIDENCE can be obtained through equation (4) which is 0.309855.

In step 330, the independent variable with the highest exclusion score can be removed from the data for updating the data. As described in steps 315 and 325, each independent variable in the correlation matrix 500 has its own exclusion score being calculated. The independent variable with the highest exclusion score would be considered the highest ranked independent variable. In some examples, the highest ranked independent variable needs to be removed from the data in order to reduce and minimize the adverse impact on the prediction of dependent variables from independent variables. In one example referring to FIG. 5, if the independent variable YRS_RESIDENCE has the highest exclusion score, then the independent variable YRS_RESIDENCE should be the first to be removed from the data. However, the independent variable with the highest correlation value would not necessarily be the independent variable with the highest exclusion score.

After removing the independent variable with the highest exclusion score (e.g., YRS_RESIDENCE) from the updated data, the updated data is tested at 335 for any remaining correlations as described in detail with respect to step 310 (i.e., an updated correlation value can be determined between at least two variables in the data). At step 340, an updated correlation matrix can be generated using the correlation values described in step 335 and the corresponding variables in the updated data. If none of the updated correlation values is greater than the threshold value, then at step 345 the data may be considered optimized data. That means no independent variables have significant correlation in the updated data. However, if at least one of the updated correlation values is greater than the threshold value, then at step 330 the updated data is determined to have multicollinearity and forwarded for processing to eliminate the multicollinearity (eliminating the newly identified top ranked variable). That means independent variables still have significant correlation in the updated data. The steps 330, 335, and 340 are performed iteratively until none of the updated correlation values is greater than the threshold value, then at step 345 the data may be considered optimized data.

Figure 6:
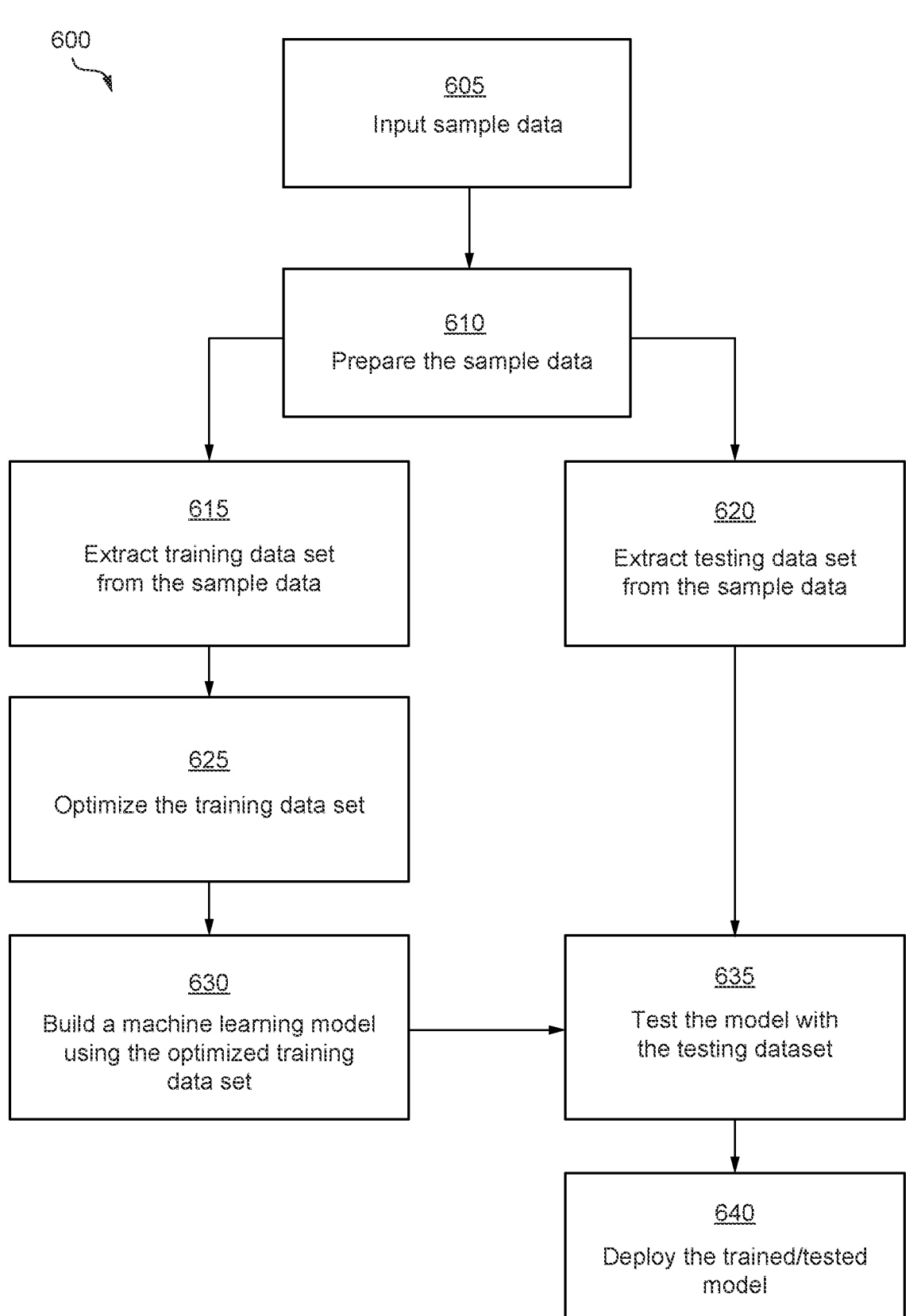
FIG. 6 depicts a flowchart illustrating a process of training, testing, and deploying a machine learning model using optimized training data in accordance with various embodiments.

FIG. 6 depicts a flowchart illustrating a process 600 of training, testing, and deploying a machine learning model using the optimized training data in accordance with various embodiments. The process 600 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIG. 2, the processing depicted in FIG. 6 may be performed by a computing environment (e.g., pipeline 200) training, testing, and deploying a prediction model (e.g., prediction model 225).

The process 600 commences in step 605, the process 600 can be implemented in software executed by processors of system or hardware to input a sample data. In some instances, the sample data can be obtained from one or more entities such as from banks, merchants, or customers. The sample data may comprise historical transaction data, loan records, credit records, customers profile, and the like. In some examples, the sample data can be extracted from population data using random sampling or stratified sampling.

In step 610, the sample data can be prepared for use to be extracted into a training dataset and testing dataset. In some examples, the preparation for sample data may include establishing data collection mechanisms, checking data quality, formatting data to make it consistent, reducing data, completing data cleaning, or the like.

In step 615, a training dataset (e.g., an initial dataset for training a model) can be extracted from the sample data. In some examples, the training data can be used to train an algorithm or machine learning model to predict the outcome that the trained model predicts. In certain implementations, the initial data in process 100 and 200 can be used as training dataset here to train the machine learning model.

In step 620, the testing dataset can be extracted from the sample data. In some examples, the test dataset can be the dataset that is independent of the training dataset and be used to test the trained machine learning model in accuracy and efficiency. In other examples, the sample data can be divided in ratio of 70% to 30% into training dataset and testing dataset, respectively.

In step 625, the training data may be optimized through certain processes to obtain an updated dataset. In some examples, the process 300 described previously can be used to optimize the training data. Therefore, the impact of linear correlation and multicollinearity among the independent variables can be reduced and minimized.

In step 630, the machine learning model can be built with the optimized training dataset. The building includes training the machine learning model using the updated dataset. In some instances, the machine learning model comprises one or more algorithms to make an inference based on relationships between a plurality of variables in the updated dataset. The training may comprise adapting the machine learning model to minimize a difference between a final value for a dependent variable and ground truth information, updating model parameters, and obtaining the trained machine learning model with updated model parameters.

In step 635, the testing dataset can be used to test the trained machine learning model. Advantageously, due to elimination of linear correlation and multicollinearity between independent variables, the testing result may be more accurate and efficient to predict the dependent variables from the independent variables.

In step 640, the trained machine-learning model is provided. In some instances, the providing comprises deploying the machine-learning model trained using the updated dataset without linear correlation and multicollinearity between independent variables in a real-world environment (e.g., a distributed system as described in detail herein). In some implementations, the user or business may use the trained machine learning model with sample data (e.g., independent variables) to predict dependent variable(s) that should be provided to the customer via a prediction model For example, the user or business may use the trained machine learning model with sample data (e.g., independent variables) to predict whether loan amount (e.g., dependent variables) should be provided to the customer via a regression model. In another example, the business may use the trained machine learning model with sample data (e.g., independent variables) to make a decision (e.g., dependent variables) on whether the loan should be provided to the customer via a classification model.

Illustrative Systems

Figure 7:
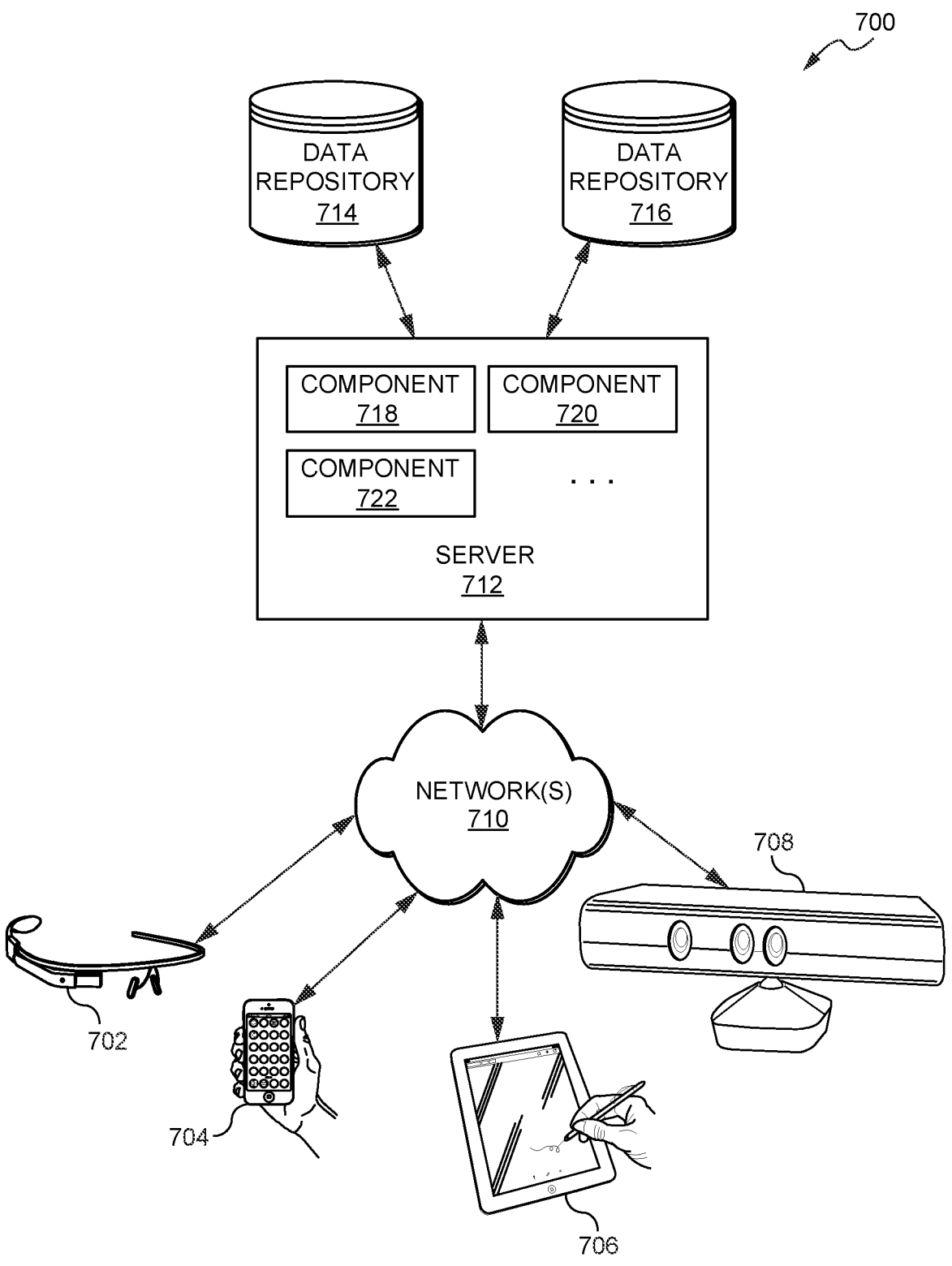
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or data optimization, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to optimization data performance or generated models for use by data optimization used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
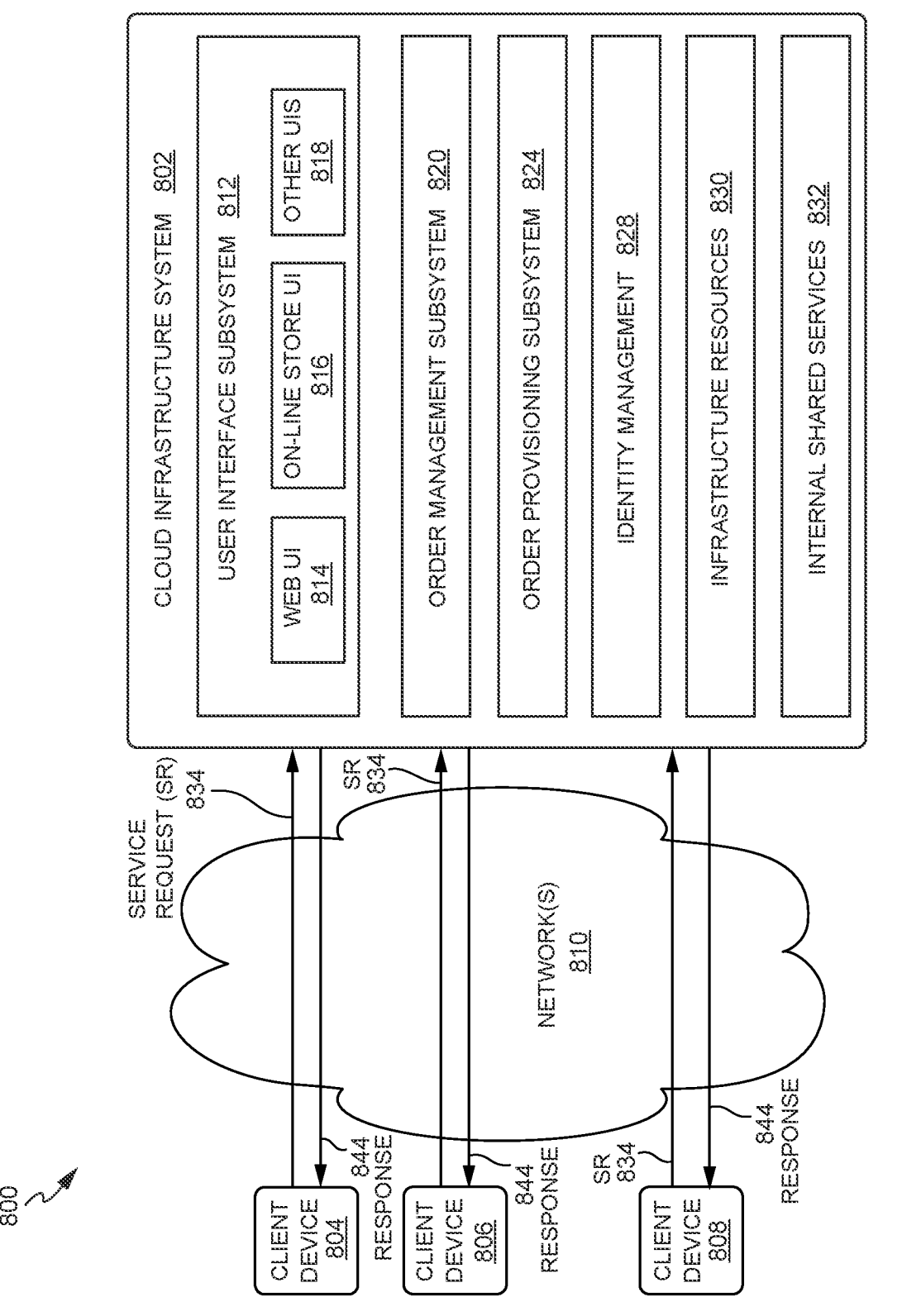
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider.

Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may request the cloud infrastructure system to take a certain action such as make a prediction, as described above, and/or provide services for a optimization data system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a data optimization as described in this disclosure.

In some examples, the processing performed by cloud infrastructure system 802 for providing services may involve model training and deployment. This analysis may involve using, analyzing, and manipulating datasets to train and deploy one or more models. This analysis may be performed by one or more processors, possibly processing the data in parallel, performing simulations using the data, and the like. For example, big data analysis may be performed by cloud infrastructure system 802 for generating and training one or more models for a data optimization system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a service offered by cloud infrastructure system 802. As part of the order, the customer may provide information identifying a data optimization system for which the service is to be provided and optionally one or more credentials for the data optimization system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a data optimization system ID generated by cloud infrastructure system 802 and information identifying a data optimization system selected by cloud infrastructure system 802 for the data optimization system corresponding to the data optimization system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
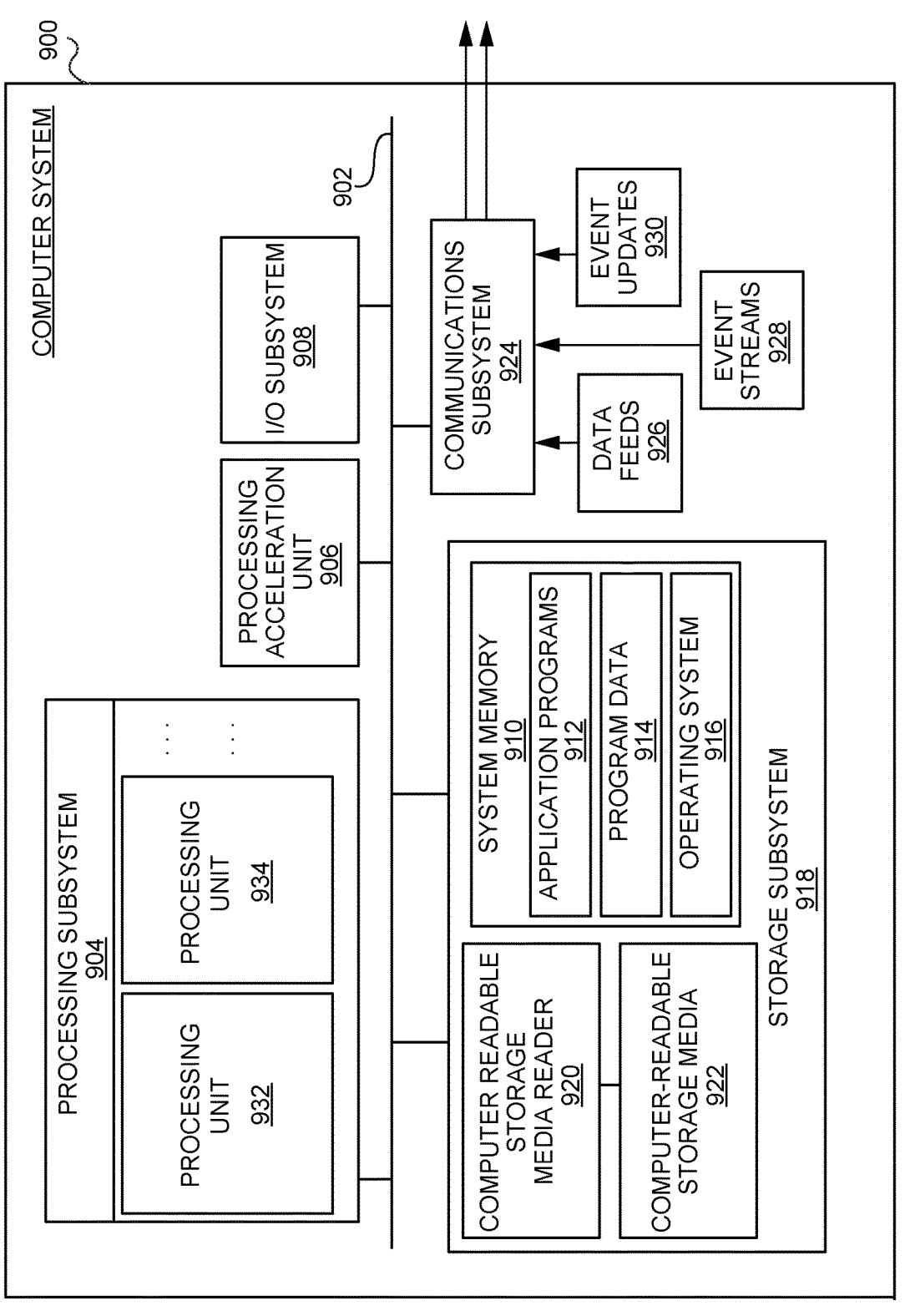
FIG. 9 illustrates an example computer system that may be used to implement various embodiments.

FIG. 9 illustrates an example of computer system 900. In some examples, computer system 900 may be used to implement any of the digital assistant or data optimization systems within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a data optimization system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
   obtaining an initial dataset, wherein the initial dataset comprises a plurality of independent variables;
   determining a plurality of correlation values by analyzing linear correlation between at least two independent variables in the plurality of independent variables in the initial dataset;
   generating a correlation matrix using at least in part the plurality of correlation values and corresponding independent variables in the plurality of independent variables in the initial dataset;
   calculating redundancy values for the independent variables in the correlation matrix, wherein the redundancy value for a corresponding independent variable depends on a number of times the corresponding independent variable appears in the correlation matrix;
   calculating prediction strengths for the independent variables in the correlation matrix, wherein the prediction strength is related to an explanatory power of the corresponding independent variable;
   calculating exclusion scores for the independent variables in the correlation matrix that exhibit multicollinearity based on redundancy values for the independent variables in the correlation matrix and prediction strengths for the independent variables in the correlation matrix;
   updating the initial dataset by removing at least one independent variable with a highest exclusion score from the plurality of independent variables to generate an updated training dataset comprising an optimized plurality of independent variables, wherein the plurality of correlation values are determined, the correlation matrix is generated, and the initial dataset is updated iteratively until multicollinearity is no longer exhibited between the independent variables;
   training a machine learning model using the updated training dataset, wherein the machine learning model comprises one or more algorithms to make an inference based on relationships between the optimized plurality of independent variables, the training comprising iteratively inputting the updated training dataset to the machine learning model to determine a set of optimal hyperparameters that minimizes a cost function; and
   generating the trained machine learning model having the set of optimal hyperparameters,
   wherein the trained machine learning model is configured to, based on a set of independent variables provided as an input, output a prediction for at least one dependent variable.

2. The method of claim 1, wherein the initial dataset comprises historical transaction data, loan records, credit records, a customer's profile, or any combination thereof.

3. The method of claim 1, wherein generating the correlation matrix using at least in part the plurality of correlation values and corresponding variables in the plurality of independent variables in the initial dataset, includes a process to:
   generate a threshold value used to compare with each correlation value in the plurality of correlation values; and
   incorporate the correlation values that are greater than the threshold value with corresponding independent variables into the correlation matrix.

4. The method of claim 1, wherein a pre-set criteria is used to determine whether a significant linear correlation exists between at least two variables in the plurality of independent variables via a threshold value, and wherein the independent variables determined to exhibit the significant linear correlation are identified as the independent variables in the correlation matrix that exhibit multicollinearity.

5. The method of claim 1, wherein the training further comprises adapting the machine learning model to minimize a difference between a final value for a dependent variable and ground truth information.

6. The method of claim 1, wherein the trained machine learning model is deployed in a real-world environment.

7. A computing system comprising:
   a processor; and
   a memory including instructions that, when executed with the processor, cause the computing system to, at least:
   obtain an initial dataset, wherein the initial dataset comprises a plurality of independent variables;
   determine a plurality of correlation values by analyzing linear correlation between at least two independent variables in the plurality of independent variables in the initial dataset;
   generate a correlation matrix using at least in part the plurality of correlation values and corresponding independent variables in the plurality of independent variables in the initial dataset;
   calculate redundancy values for the independent variables in the correlation matrix, wherein the redundancy value for a corresponding independent variable depends on a number of times the corresponding independent variable appears in the correlation matrix;

calculate prediction strengths for the independent variables in the correlation matrix, wherein the prediction strength is related to an explanatory power of the corresponding independent variable;

calculate exclusion scores for the independent variables in the correlation matrix that exhibit multicollinearity based on redundancy values for the independent variables in the correlation matrix and prediction strengths for the independent variables in the correlation matrix;

update the initial dataset by removing at least one independent variable with a highest exclusion score from the plurality of independent variables to generate an updated training dataset comprising an optimized plurality of independent variables, wherein the plurality of correlation values are determined, the correlation matrix is generated, and the initial dataset is updated iteratively until multicollinearity is no longer exhibited between the independent variables;

train a machine learning model using the updated training dataset, wherein the machine learning model comprises one or more algorithms to make an inference based on relationships between the optimized plurality of independent variables, the training including iteratively inputting the updated training dataset to the machine learning model to determine a set of optimal hyperparameters that minimizes a cost function; and generate the trained machine learning model having the set of optimal hyperparameters, wherein the trained machine learning model is configured to, based on a set of independent variables provided as an input, output a prediction for at least one dependent variable.

8. The computing system of claim 7, wherein the initial dataset comprises historical transaction data, loan records, credit records, a customer's profile, or any combination thereof.

9. The computing system of claim 7, wherein generating the correlation matrix using at least in part the plurality of correlation values and corresponding independent variables in the plurality of independent variables in the initial dataset, includes a process to:

generate a threshold value used to compare with each correlation value in the plurality of correlation values; and incorporate the correlation values that are greater than the threshold value with corresponding independent variables into the correlation matrix.

10. The computing system of claim 7, wherein a pre-set criteria is used to determine whether a significant linear correlation exists between at least two variables in the plurality of independent variables via a threshold value, and wherein the independent variables determined to exhibit the significant linear correlation are identified as the independent variables in the correlation matrix that exhibit multicollinearity.

11. The computing system of claim 7, wherein the training further includes adapting the machine learning model to minimize a difference between a final value for a dependent variable and ground truth information.

12. The computing system of claim 11, wherein the trained machine learning model is deployed in a real-world environment.

13. A non-transitory computer readable medium storing specific computer-executable instructions that, when executed by a processor, cause a computer system to at least:

obtain an initial dataset, wherein the initial dataset comprises a plurality of independent variables;

determine a plurality of correlation values by analyzing linear correlation between at least two independent variables in the plurality of independent variables in the initial dataset;

generate a correlation matrix using at least in part the plurality of correlation values and corresponding independent variables in the plurality of independent variables in the initial dataset;

calculate redundancy values for the independent variables in the correlation matrix, wherein the redundancy value for a corresponding independent variable depends on a number of times the corresponding independent variable appears in the correlation matrix;

calculate prediction strengths for the independent variables in the correlation matrix, wherein the prediction strength is related to an explanatory power of the corresponding independent variable;

calculate exclusion scores for the independent variables in the correlation matrix that exhibit multicollinearity based on redundancy values for the independent variables in the correlation matrix and prediction strengths for the independent variables in the correlation matrix;

update the initial dataset by removing at least one independent variable with a highest exclusion score from the plurality of independent variables to generate an updated training dataset comprising an optimized plurality of independent variables, wherein the plurality of correlation values are determined, the correlation matrix is generated, and the initial dataset is updated iteratively until multicollinearity is no longer exhibited between the independent variables;

train a machine learning model using the updated training dataset, wherein the machine learning model comprises one or more algorithms to make an inference based on relationships between the optimized plurality of independent variables, the training including iteratively inputting the updated training dataset to the machine learning model to determine a set of optimal hyperparameters that minimizes a cost function; and generate the trained machine learning model having the set of optimal hyperparameters, wherein the trained machine learning model is configured to, based on a set of independent variables provided as an input, output a prediction for at least one dependent variable.

14. The non-transitory computer readable medium of claim 13, wherein generating the correlation matrix using at least in part the plurality of correlation values and corresponding independent variables in the plurality of independent variables in the initial dataset, includes a process to:

generate a threshold value used to compare with each correlation value in the plurality of correlation values; and incorporate the correlation values that are greater than the threshold value with corresponding independent variables into the correlation matrix.

15. The non-transitory computer readable medium of claim 13, a pre-set criteria is used to determine whether a significant linear correlation exists between at least two variables in the plurality of independent variables via a threshold value, and wherein the independent variables determined to exhibit the significant linear correlation are identified as the independent variables in the correlation matrix that exhibit multicollinearity.

16. The non-transitory computer readable medium of claim 13, wherein the training further includes adapting the machine learning model to minimize a difference between a final value for a dependent variable and ground truth information.

17. The non-transitory computer readable medium of claim 13, wherein the trained machine learning model is deployed in a real-world environment.

* * * * *